INVENTORS
James H. Guyton &
Kenneth S. Vogt
BY E. W. Christen
ATTORNEY

TRANSISTOR POWER OSCILLATOR

Filed May 31, 1955 2 Sheets-Sheet 2

INVENTORS
James H. Guyton &
Kenneth S. Vogt
BY E. W. Christen
ATTORNEY 2,925,560

TRANSISTOR POWER OSCILLATOR

James H. Guyton and Kenneth S. Vogt, Kokomo, Ind., assignors to General Motors Corporation, Detroit, Mich., a corporation of Delaware Application May 31, 1955, Serial No. 512,176

8 Claims. (Cl. 331—62)

Figure 1:
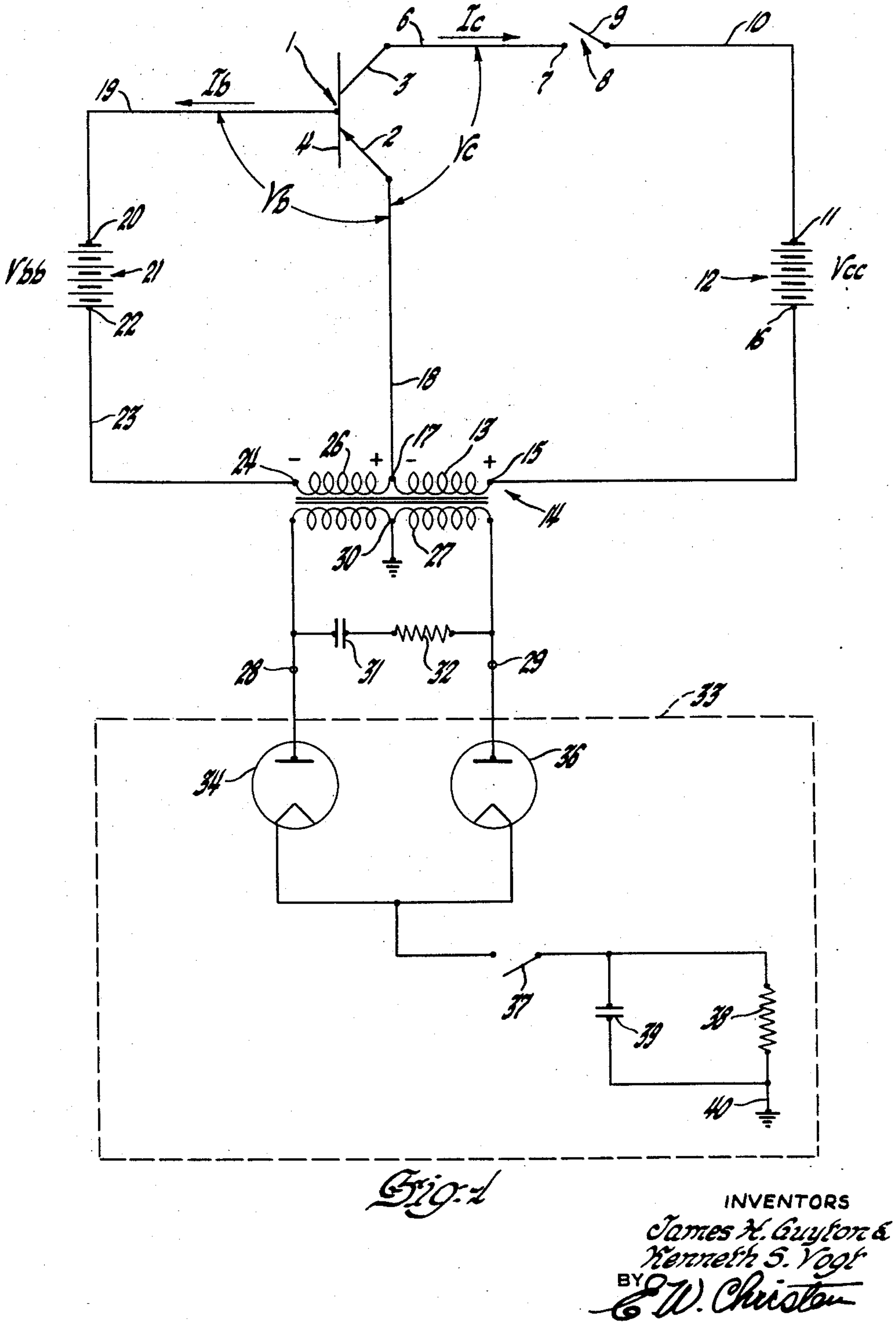

This invention relates to oscillation generators and more particularly to oscillator circuits utilizing semiconductor amplifying devices known in the art as transistors.

The oscillation generator of this invention is adapted to produce sustained oscillations from a direct source and is of general utility for generating reference and control voltages, signaling voltages, supply voltages, and the like. However, it is especially adapted to produce, from a relatively low voltage source of direct current, an alternating voltage which may be transformed to any desired value. Such circuits are commonly known as inverters.

In one important application, inverter circuits are employed to supply plate voltage for vacuum tube circuits in mobile radio equipment. This application requires a substantial amount of power at a relatively high voltage from a direct current source such as a storage battery. It has been a common practice, in this use, to utilize electro-mechanical inverting devices such as vibratory interrupters or dynamotors. Such electro-mechanical devices, however, are subject to numerous disadvantages including the use of switching contacts or sliding contacts which require constant maintenance and contribute to short operating life. Additional factors which render electro-mechanical inverters disadvantageous, especially in mobile equipment, are space requirements and weight.

Transistors afford mechanical and electrical characteristics which are especially advantageous in many electronic applications. It is well known that the transistor may function to amplify electrical signals and hence it may be utilized to generate sustained oscillations when provided with appropriate circuitry. Thus, the transistor offers a convenient means for converting direct current voltages to alternating current voltages for general application and particularly, significant advantages may be realized by utilizing transistors in inverter circuits. The transistor is mechanically rugged, small in size and weight, and has a long operating life. It may be operated efficiently from a low voltage source.

The adaptation of transistors to inverter circuits, however, is subjected to certain difficulties. To be of practical value, the device must be capable of generating substantial alternating current power without exceeding the current and voltage rating of the transistor. To obtain high power output and efficiency, it is desirable to utilize an output impedance of relatively low resistance and high reactance and since the transistor is subject to damage by high inverse voltage, special precautions must be taken.

It is a principal object of this invention to provide a transistor oscillation generator which is of simple circuit desgn and capable of being energized from a low voltage direct current source.

It is another object to provide a transistor oscillator of the feedback type capable of generating alternating current output of relatively high power from a low voltage direct current source.

Another object of this invention is to provide a transistor oscillator which produces a square wave output.

An additional object is to provide an inverter circuit utilizing a transistor oscillator for producing a high voltage output from a low voltage direct current source.

A further object is to provide a transistor oscillator with a high power output and utilizing inductive feedback with means to prevent excessive inverse voltages on the transistor electrodes.

In achieving these and other objects, a transistor is connected with a source of low voltage direct current in a circuit between the collector electrode and the emitter electrode and inductive feedback is provided between the collector and base circuits. A transformer in the collector circuit is utilized to provide output voltages of the desired value. Excessive inverse voltages on the transistor electrodes are avoided by providing an associated energy absorbing circuit.

A more complete understanding of the manner in which the foregoing objects are attained may be had from the detailed description which follows taken with the accompanying drawings in which:

Figure 1 shows a schematic representation of the inventive oscillation generator in an illustrative embodiment.

Figures 2A, 2B, 2C, and 2D show the waveshapes of the oscillation generator voltages and currents which appear in selected portions of the circuit of Figure 1 under no load operating conditions.

Figures 3A, 3B, 3C, 3D, and 3E show the waveshapes of the oscillation generator voltages and currents which appear in selected portions of the circuit operating with a connected load.

Referring now to Figure 1, there is shown schematically an illustrative embodiment of the invention in an inverter circuit for producing a relatively high alternating current voltage from a direct current source of low voltage. The circuit comprises a transistor 1 having an emitter electrode 2, a collector electrode 3 and a base electrode 4. It will be apparent that the transistor may be of either the junction or the point contact type. The illustrative embodiment will be described with respect to a P–N–P junction type transistor in which the emitter and collector are of a conductivity type having holes as majority carriers and the base is of the opposite conductivity type having electrons as the majority carriers.

The collector or output circuit of the transistor 1 extends from the collector electrode 3 through conductor 6 to the fixed contact 7 of switch 8 of any suitable type adapted to interrupt and complete energization of the circuit. The movable contact 9 is connected by way of conductor 10 to one terminal 11 of the collector supply voltage source such as battery 12. The collector circuit is provided with a load impedance of low resistance and high inductance comprising the primary winding 13 of transformer 14, the terminal 15 being connected to the positive terminal 16 of battery 12. The terminal 17 of primary winding 13 is connected by conductor 18 to the emitter electrode 2, thus completing the path for the collector current. It will be noted that the collector electrode is biased in the reverse or non-conducting direction with respect to the emitter electrode by the collector supply voltage source 12 and thus no collector current flows in the absence of base current.

The base electrode 4 is connected by conductor 19 to the negative terminal 20 of the base bias voltage source represented as a battery 21 The positive terminal 22 of the battery 21 is connected through conductor 23 to the terminal 24 of the feedback winding 26 of transformer 14. This connection provides a bias voltage on the base electrode tending to cause current flow in the forward or conductive direction between the base electrode and the emitter electrode. The magnitude of the base bias voltage $V_{bb}$ may be a very small value since the forward impedance between emitter and base electrodes is of small value. The requirement to be met is that sufficient initial base current flows under the influence of $V_{bb}$ to support current flow in the collector circuit. This requirement may be met by the occurrence of small transient voltages in the circuit due to closing switch 9 or other disturbances, in which case the base bias voltage source 21 is not essential. To insure the desired starting action, however, it is preferable to provide a base voltage such as battery 21. The feedback winding 26 is inductively coupled to the primary winding 13 in the collector circuit and is wound in the same direction to provide a positive or regenerative feedback voltage in the base circuit in response to increasing current values in the collector circuit. It will be apparent that windings 13 and 26 may be separate windings or may be a continuous winding from terminal 15 to terminal 24 having an intermediate tap 17.

The output voltage of the oscillation generator developed across primary winding 13 is coupled to a load circuit by secondary winding 27 provided with terminals 28 and 29 adapted to be connected to a load 33.

Figure 2:
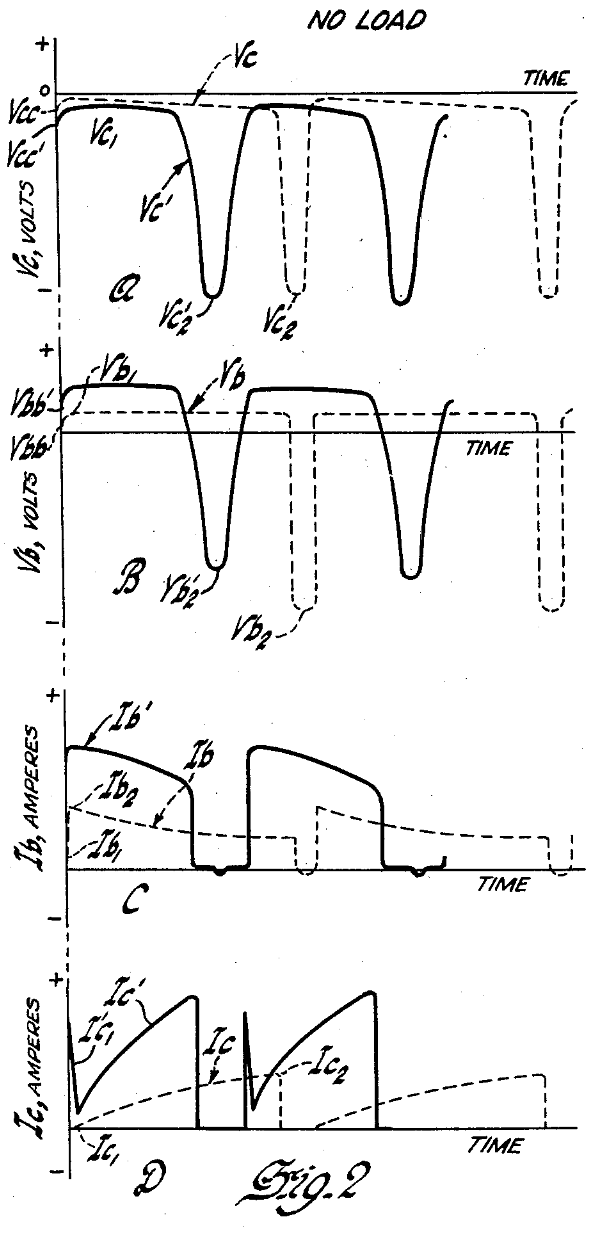

Before proceeding further with the description of the circuits, an explanation will be given of the operation of the oscillation generator thus far described. Reference is made to the dashed line waveshapes of Figures 2A, 2B, 2C, and 2D, slightly exaggerated for explanatory purposes, which will serve to illustrate the operation, neglecting any transients occurring during the first few cycles. Oscillations in the collector circuit are initiated, upon closing switch 8 by a base current $I_b$ flowing in the forward direction under the influence of base bias voltage $V_{bb}$. This base current, as seen in Figure 2C, has an initially small value $I_{b1}$ which will sustain a collector current $I_c$, shown in Figure 2D, having an initially small value, $I_{c1}$. The collector current $I_c$ produces a voltage drop across primary winding 13 with the polarity shown in Figure 1 and a feedback voltage of like polarity is induced in winding 26 increasing the base voltage $V_b$, shown in Figure 2B, from the initial bias value $V_{bb}$ to the value $V_{b1}$. Consequently, the base current $I_b$, Figure 2C, is increased very rapidly to a value, $I_{b2}$, limited by the base circuit resistance. The collector current $I_c$, Figure 2D, therefore increases further and the collector voltage $V_c$, Figure 2A, decreases to $V_{c1}$ due to the reduction of emitter to collector impedance by the base current. Since the base current $I_b$ depends upon the feedback voltage, which decreases in amplitude as the rate of change of collector current $I_c$ decreases, Figure 2D, the base current $I_b$, Figure 2C, decreases throughout the remainder of the cycle from its maximum value $I_{b2}$. The rate of increase of collector current $I_c$, Figure 2D, is determined largely by the inductance of the collector circuit. The collector current increases to a maximum value $I_{c2}$ determined by the corresponding value of base current $I_b$ and the current gain of the transistor. When this value is reached the feedback voltage decreases to zero and the base current and collector current decrease abruptly and the conductive portion of the cycle is terminated.

During the abrupt decrease of collector current $I_c$ from its maximum value $I_{c2}$, Figure 2D, the magnetic field of the transformer 14 collapses and the polarity of the voltage across primary winding 13 reverses. The energy of this field is dissipated in the collector circuit through the high backward impedance between emitter and collector electrodes and a high inverse collector voltage peak $V_{c2}$, Figure 2A, is developed across these electrodes. Similarly, the voltage across feedback winding 26 reverses polarity and a high inverse base voltage peak $V_{b2}$, Figure 2B, is developed across the emitter and base electrodes. The non-conductive portion of the cycle is terminated upon the dissipation of the stored energy of the magnetic field and a new cycle is initiated.

These inverse voltages must be limited in amplitude to avoid the destructive effect of exceeding the inverse voltage ratings of the transistor. In the circuit thus far described, the inverse voltage amplitude may be limited to a non-destructive value by operation with a reduced value of collector supply voltage $V_{cc}$. This, of course, restricts the power output of the oscillation generator to a value below that which it would otherwise be capable of generating.

In order to realize maximum power output, additional circuitry is provided to reduce the amplitude of the inverse voltages occurring during the non-conductive portion of the cycle. Referring again to Figure 1, output voltage is developed across output terminals 28 and 29 of transformer secondary 27 which may suitably have a grounded center tap 30. An energy absorbing circuit comprising serially connected capacitor 31 and resistor 32 is connected across output terminals 28 and 29. Alternatively, the capacitor 31 and resistor 32 may be connected across terminals 24 and 15 of transformer 14 with suitable adjustment of capacitance and resistance values in accordance with the transformation ratio of transformer 14.

The operation and advantages of the circuit including capacitor 31 and resistor 32 are illustrated in Figures 2A, 2B, 2C, and 2D which shows the waveforms in solid lines for operation at no load. When the output is supplied to the plate circuits of vacuum tubes, for example, no-load operation occurs during the warm-up interval of the tubes. The addition of the energy absorbing capacitor 31 and resistor 32 permits circuit operation with a substantially higher value of collector supply voltage such as the value $V_{cc}'$ indicated in Figure 2A.

For example, an illustrative embodiment of the oscillation generator without the capacitor 31 and resistor 32 included components as follows:

| | |
|---|---|
| Transistor ----- | RTMA number 2N 57. |
| Transformer --- | Laminated iron core: Windings **13** and **26**—64 turns each; winding **27**—1640 turns; primary inductance—150 millihenries. |
| Frequency ----- | 330 cycles per second. |
| Base bias $E_{bb}$ -- | Approximately 0.1 volt. |

In this embodiment of the collector supply voltage $V_{cc}$ was limited to approximately 4.9 volts to avoid destructive inverse voltages on the transistor. With a capacitor 31 of 0.01 microfarad and a resistor 32 of 23,000 ohms included in the circuit, the collector supply voltage $V_{cc}$ was increased to approximately 15.6 volts (with $V_{bb}$ approximately 0.4 volt) without exceeding the inverse voltage ratings of the transistor. It will be noted in Figure 2A that the inverse peak collector voltage $V_{c2}'$ and in Figure 2B that the inverse peak base voltage $V_{b2}'$ are limited in amplitude to values corresponding to $V_{c2}$ and $V_{b2}$, respectively, and are well within the peak inverse voltage ratings of the transistor. During the non-conducting portion of the cycle, the stored energy of the magnetic field is dissipated in circulating currents in capacitor 31 and resistor 32. The capacitor 31 and resistor 32 are effective to decrease the impedance across terminals 15 and 24 to a value substantially lower than that presented by the backward impedance of the transistor electrodes when no base current flows. Thus the amplitude of the inverse voltage peak is decreased and the time interval of the inverse voltage is somewhat increased. The wave forms of voltages and currents are otherwise similar to those previously described for no load operation with the exception that a spike $I_{c1}'$ of collector current $I_c'$, Figure 2D, flows at the initiation of a cycle to charge the condenser 31.

A change in frequency will also be noted in Figures 2A, 2B, 2C and 2D for the two different operating conditions. Operating frequency depends upon the current gain of the transistor employed and is a function of output inductance. Very satisfactory operation has been achieved at 330 and 20,000 cycles per second and this range can be extended, of course, with the choice of proper components.

Operation with a load, such as that represented in block 33 provides a maximum power output with a substantially square wave of output voltage and current. In the load circuit 33 there is included a full wave rectifier comprising diodes 34 and 36 which may be connected through a suitable switch 37 to supply direct current power at high voltage to any desired utilization device represented for simplicity by the filter load including parallel connected resistor 38 and capacitor 39 which are connected to ground 40.

Figure 3:
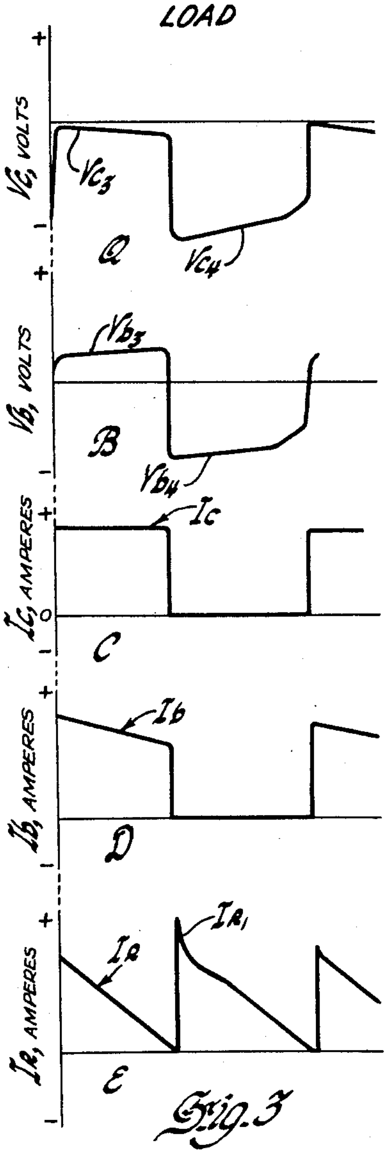

The waveforms of Figure 3 illustrate the operation under load with full wave rectification of the output voltage. Note that the voltage waveforms $V_c$ and $V_b$, Figures 3A and 3B are quite similar to those for no-load operation except that the inverse voltages $V_{c4}$ and $V_{b4}$ are substantially square waves similar to the waveshapes of the voltages $V_{c3}$ and $V_{b3}$ which occur during the conductive portion of the cycle. The collector current $I_c$, Figure 3C, rises immediately to the value which the base current $I_b$, Figure 3D, will sustain because of the low impedance reflected into the collector circuit by the transformer and the load impedance. The collector current remains at this value until conduction is cut off. The rectifier current $I_R$, Figure 3E, is generally of sawtooth form but has a high value $I_{R1}$ during the inverse voltage swing when the voltage attempts to change quickly. The current $I_R$ decreases as the stored energy of the magnetic field is dissipated.

This invention has been described with respect to a particular embodiment which is illustrative only and is not to be constructed in a limiting sense. Many modifications and variations within the spirit and scope of the invention will now occur to those skilled in the art. For a definition of the invention, reference is made to the appended claims.

We claim:

1. An oscillation generator comprising a transistor having emitter, collector, and base electrodes, a transformer including primary and secondary windings, a collector circuit including a collector supply voltage source connected between said collector electrode and one terminal of said primary winding, a base circuit connected between said base electrode and the other terminal of said primary winding, said emitter electrode being connected to an intermediate tap on said primary winding, and a load device adapted to be connected across said secondary winding.

2. An oscillation generator comprising a transistor having emitter, collector, and base electrodes, a transformer including primary and secondary windings, a collector circuit including a collector supply voltage source connected between said collector electrode and one terminal of said primary winding, a base circuit connected between said base electrode and the other terminal of said primary winding, an intermediate tap on said primary winding conncted to said emitter electrode, an energy absorbing circuit connected across the terminals of one of said transformer windings, and a load device adapted to be connected across the terminals of said secondary winding.

3. An oscillation generator comprising a transistor having emitter, collector, and base electrodes, a collector circuit connected between said collector electrode and said emitter electrode including a transformer primary winding and a collector supply voltage source, a base circuit connected between said emitter and said base electrode and including a base bias voltage source and an inductor coupled to said primary winding whereby a feedback voltage is supplied to said base circuit, a transformer secondary winding inductively coupled to said primary winding and connected to a load circuit, and an energy absorbing circuit including a resistor connected across the terminals of one of said transformer windings.

4. An oscillation generator comprising a transistor having emitter, collector, and base electrodes, an output circuit connected between said collector electrode and said emitter electrode including a transformer primary winding and a collector supply voltage source, a base circuit connected between said emitter and base electrodes including a base bias voltage source and a feedback winding inductively coupled to said primary winding, a transformer secondary winding inductively coupled to said primary winding and having output terminals for connection to a load circuit, and an energy absorbing circuit connected across said output terminals including a capacitor and a serially connected resistor.

5. A transistor oscillation generator including a transistor having an output circuit and a transformer coupling said output circuit to a load circuit, an energy absorbing circuit connected across one winding of said transformer, said energy absorbing circuit presenting an impedance value across the primary terminals of said transformer which is substantially less than the backward impedance value between electrodes of the transistor during the nonconductive period of said output circuit, thereby preventing destructive inverse voltages across the electrodes of said transistor.

6. A transistor oscillation generator including a transistor having an output circuit connected between electrodes of said transistor and coupled to a load circuit by an output transformer, an energy absorbing circuit connected across the secondary winding of said transformer including a resistor and having an impedance value less than the backward impedance value of the output circuit during the non-conductive period of said output circuit for dissipating a portion of the energy stored in said transformer.

7. A transistor oscillation generator including a transistor having an output circuit connected between electrodes of said transistor and coupled to a load circuit by an output transformer, an energy absorbing circuit connected across the secondary winding of said transformer including a resistor and serially connected capacitor, said energy absorbing circuit presenting an impedance value to said transformer substantially less than the backward impedance between electrodes of the transistor during the collapse of the magnetic field of said transformer, whereby a portion of the energy stored in said transformer is dissipated in said energy absorbing circuit.

8. An oscillation generator comprising a transistor having emitter, collector, and base electrodes, a transformer having primary, secondary, and feedback windings and a core having a non-saturating relation between magnetizing force and flux density over the operating range, a collector circuit connected between said collector electrode and said emitter electrode including the primary winding and a collector supply voltage source, a base circuit connected between said emitter electrode and said base electrode and including said feedback winding in a regenerative connection whereby the collector circuit current on each cycle reaches a saturation value determined by the base circuit resistance and the current gain of the transistor, an energy absorbing circuit including a resistor connected across the terminals of one of said transformer windings, and a load circuit connected across said secondary winding.

References Cited in the file of this patent

UNITED STATES PATENTS

| | | |
|---|---|---|
| 2,556,296 | Rack | June 12, 1951 |
| 2,676,295 | Douma | Apr. 20, 1954 |
| 2,693,535 | White | Nov. 2, 1954 |
| 2,701,309 | Barney | Feb. 1, 1955 |
| 2,783,384 | Bright et al. | Feb. 26, 1957 |
| 2,847,569 | Finkelstein | Aug. 12, 1958 |
| 2,849,610 | Umbach | Aug. 26, 1958 |